United States Patent
Ellingsrud et al.

(10) Patent No.: US 8,228,066 B2
(45) Date of Patent: Jul. 24, 2012

(54) INSTRUMENT FOR MEASURING ELECTROMAGNETIC SIGNALS

(75) Inventors: Svein Ellingsrud, Trondheim (NO); Audun Sodal, Ranheim (NO); Hans Rechsteiner, Trondheim (NO)

(73) Assignee: Electromagnetic Geoservices AS, Trondheim (NO)

( * ) Notice: Subject to any disclaimer, the term of this patent is extended or adjusted under 35 U.S.C. 154(b) by 532 days.

(21) Appl. No.: 12/304,073

(22) PCT Filed: Jun. 8, 2007

(86) PCT No.: PCT/GB2007/002138
§ 371 (c)(1),
(2), (4) Date: Mar. 10, 2009

(87) PCT Pub. No.: WO2007/141548
PCT Pub. Date: Dec. 13, 2007

(65) Prior Publication Data
US 2010/0231223 A1    Sep. 16, 2010

(30) Foreign Application Priority Data
Jun. 9, 2006    (GB) .................................. 0611497.9

(51) Int. Cl.
*G01V 3/00*    (2006.01)
(52) U.S. Cl. ........ 324/323; 324/347; 324/354; 324/357; 324/365
(58) Field of Classification Search .................. 324/323, 324/347, 354, 357, 365
See application file for complete search history.

(56) References Cited

U.S. PATENT DOCUMENTS

| | | |
|---|---|---|
| 1,818,331 A | 8/1931 | Jakosky |
| 2,077,707 A | 4/1937 | Melton |

(Continued)

FOREIGN PATENT DOCUMENTS

EP    0087271    8/1983

(Continued)

OTHER PUBLICATIONS

Barton et al., "LITHOS", Cambridge Advanced Lithological Imaging Project Phase 1: 1998-2001 Sub-basalt Imaging, Aug. 21, 1997.

(Continued)

*Primary Examiner* — Huy Q Phan
*Assistant Examiner* — Son Le
(74) *Attorney, Agent, or Firm* — Patterson Thuente Christensen Pedersen, P.A.

(57) ABSTRACT

A device and method for measuring electromagnetic signals that can be used to take measurements at or near the sea floor. The device comprises a central housing, a data management system located within the housing and at least two arms extending outwards from the housing. Each arm comprises a flexible elongate sheath attached to the housing, a sensor head, a flexible electrical cable attached to the sheath and connecting the sensor head to the data management system and a rod which is removeably locatable within the sheath. The rod is connectable relative to the housing at one end and connectable relative to the sensor head at the end remote from the housing.

15 Claims, 4 Drawing Sheets

U.S. PATENT DOCUMENTS

| | | |
|---|---|---|
| 2,139,460 A | 12/1938 | Potapenko |
| 2,268,106 A | 12/1941 | Blau |
| 2,426,918 A | 9/1947 | Barret |
| 2,531,088 A | 11/1950 | Thompson |
| 2,766,422 A | 10/1956 | Carbonetto |
| 2,907,389 A | 10/1959 | Hitzman |
| 2,919,397 A | 12/1959 | Morley |
| 2,953,742 A | 9/1960 | Herbold |
| 3,052,836 A | 9/1962 | Postma |
| 3,105,014 A | 9/1963 | Harrison |
| 3,113,316 A | 12/1963 | Berry |
| 3,114,875 A | 12/1963 | Haagensen |
| 3,182,250 A | 5/1965 | Conti et al. |
| 3,332,487 A | 7/1967 | Jones |
| 3,398,356 A | 8/1968 | Still |
| 3,548,299 A | 12/1970 | Duroux et al. |
| 3,763,419 A | 10/1973 | Barringer |
| 3,806,795 A | 4/1974 | Morey |
| 3,819,246 A | 6/1974 | List |
| 3,836,960 A | 9/1974 | Gehman et al. |
| 3,959,721 A | 5/1976 | Roschuk et al. |
| 4,010,413 A | 3/1977 | Daniel |
| 4,041,372 A | 8/1977 | Miller et al. |
| 4,047,098 A | 9/1977 | Duroux |
| 4,077,686 A | 3/1978 | Bukaitz |
| 4,079,309 A | 3/1978 | Seeley |
| 4,094,304 A | 6/1978 | Wright, Jr. |
| 4,168,484 A | 9/1979 | Wright, Jr. |
| 4,218,678 A | 8/1980 | Fowler et al. |
| 4,229,809 A | 10/1980 | Schwalbe |
| 4,245,191 A | 1/1981 | Schroeder |
| 4,258,321 A | 3/1981 | Neale, Jr. |
| 4,258,322 A | 3/1981 | Rocroi et al. |
| 4,283,099 A | 8/1981 | Burton |
| 4,296,379 A | 10/1981 | Yoshizumi |
| 4,298,840 A | 11/1981 | Bischoff et al. |
| 4,308,499 A | 12/1981 | Thierbach et al. |
| 4,396,885 A | 8/1983 | Constant |
| 4,417,210 A | 11/1983 | Rocroi et al. |
| 4,446,434 A | 5/1984 | Sternberg et al. |
| 4,451,789 A | 5/1984 | Meador |
| 4,456,067 A | 6/1984 | Pinner |
| 4,489,276 A | 12/1984 | Yu |
| 4,492,924 A | 1/1985 | Nilsson |
| 4,494,805 A | 1/1985 | Washburn |
| 4,500,146 A | 2/1985 | Peterson |
| 4,504,833 A | 3/1985 | Fowler et al. |
| 4,506,225 A | 3/1985 | Loveless et al. |
| 4,516,226 A | 5/1985 | Peynaud et al. |
| 4,547,733 A | 10/1985 | Thoraval |
| 4,583,095 A | 4/1986 | Peterson |
| 4,594,551 A | 6/1986 | Cox et al. |
| 4,616,184 A | 10/1986 | Lee et al. |
| 4,617,518 A | 10/1986 | Srnka |
| 4,633,182 A | 12/1986 | Dzwinel |
| 4,652,829 A | 3/1987 | Safinya |
| 4,660,645 A | 4/1987 | Newlove |
| 4,677,438 A | 6/1987 | Michiguchi et al. |
| 4,698,791 A | 10/1987 | Cunningham |
| 4,760,340 A | 7/1988 | Denzau et al. |
| 4,791,998 A | 12/1988 | Hempkins et al. |
| 4,793,664 A | 12/1988 | Jackson |
| 4,835,473 A | 5/1989 | Bostick, Jr. |
| 4,835,474 A | 5/1989 | Parra et al. |
| 4,906,575 A | 3/1990 | Silver et al. |
| 4,926,394 A | 5/1990 | Doyen |
| 4,957,172 A | 9/1990 | Patton et al. |
| 4,986,354 A | 1/1991 | Cantu |
| 4,992,995 A | 2/1991 | Favret |
| 5,025,218 A | 6/1991 | Ramstedt |
| 5,025,222 A | 6/1991 | Scott et al. |
| 5,032,794 A | 7/1991 | Ridd et al. |
| 5,039,179 A | 8/1991 | Chouzenoux |
| 5,043,667 A | 8/1991 | Schofield |
| 5,066,916 A | 11/1991 | Rau |
| 3,990,123 A | 4/1992 | Martinez |
| 5,103,920 A | 4/1992 | Patton et al. |
| 5,170,440 A | 12/1992 | Cox |
| 5,172,480 A | 12/1992 | Labuc et al. |
| 5,177,445 A | 1/1993 | Cross |
| 5,185,578 A | 2/1993 | Stolarczykz |
| 5,192,952 A | 3/1993 | Johler |
| 5,219,386 A | 6/1993 | Kletzmaier et al. |
| 5,280,284 A | 1/1994 | Johler |
| 5,357,253 A | 10/1994 | Van Etten et al. |
| 5,369,892 A | 12/1994 | Dhaemers |
| 5,373,443 A | 12/1994 | Lee et al. |
| 5,400,030 A | 3/1995 | Duren et al. |
| D359,403 S | 6/1995 | Tisbo et al. |
| 5,421,646 A | 6/1995 | McNamara et al. |
| D361,446 S | 8/1995 | Acard |
| 5,444,619 A | 8/1995 | Hoskins et al. |
| H1490 H | 9/1995 | Thompson et al. |
| D362,767 S | 10/1995 | Kelly et al. |
| D366,376 S | 1/1996 | Tisbo et al. |
| D366,577 S | 1/1996 | Tisbo et al. |
| 5,486,764 A | 1/1996 | Thompson et al. |
| H1524 H | 4/1996 | Thompson et al. |
| H1561 H | 7/1996 | Thompson |
| 5,563,513 A | 10/1996 | Tasci |
| 5,564,806 A | 10/1996 | Keisling et al. |
| 5,581,024 A | 12/1996 | Meyer, Jr. et al. |
| 5,689,068 A | 11/1997 | Locatelli et al. |
| 5,690,401 A | 11/1997 | Franklin |
| 5,704,142 A | 1/1998 | Stump |
| 5,724,309 A | 3/1998 | Higgs et al. |
| 5,767,679 A | 6/1998 | Schroder |
| 5,770,945 A * | 6/1998 | Constable ..................... 324/350 |
| 5,777,478 A | 7/1998 | Jackson |
| 5,798,892 A | 8/1998 | Kobayashi et al. |
| 5,811,973 A | 9/1998 | Meyer, Jr. |
| 5,825,188 A | 10/1998 | Montgomery et al. |
| 5,838,634 A | 11/1998 | Jones |
| 5,841,280 A | 11/1998 | Yu et al. |
| 5,877,995 A | 3/1999 | Thompson et al. |
| 5,886,526 A | 3/1999 | Wu |
| 5,892,361 A | 4/1999 | Meyer, Jr. et al. |
| 5,894,450 A | 4/1999 | Schmidt et al. |
| 5,901,795 A | 5/1999 | Tsao et al. |
| 5,905,380 A | 5/1999 | Weiner et al. |
| 5,905,657 A | 5/1999 | Celniker |
| 5,940,777 A | 8/1999 | Keskes |
| 5,955,884 A | 9/1999 | Payton et al. |
| 5,987,388 A | 11/1999 | Crawford et al. |
| 5,996,414 A | 12/1999 | Mercado |
| 6,002,357 A | 12/1999 | Redfern et al. |
| 6,005,916 A | 12/1999 | Johnson et al. |
| 6,011,557 A | 1/2000 | Keskes et al. |
| 6,023,168 A | 2/2000 | Minerbo |
| 6,026,913 A | 2/2000 | Mandal et al. |
| 6,041,018 A | 3/2000 | Roche |
| 6,049,760 A | 4/2000 | Scott |
| 6,060,884 A | 5/2000 | Meyer, Jr. et al. |
| 6,060,885 A | 5/2000 | Tabarovsky et al. |
| 6,061,412 A | 5/2000 | Stucker et al. |
| 6,087,833 A | 7/2000 | Jackson |
| 6,101,448 A | 8/2000 | Ikelle et al. |
| 6,108,605 A | 8/2000 | Doyle et al. |
| 6,114,972 A | 9/2000 | Smith |
| 6,140,819 A | 10/2000 | Peterman et al. |
| 6,157,195 A | 12/2000 | Vail, III |
| 6,163,155 A | 12/2000 | Bittar |
| 6,181,138 B1 | 1/2001 | Hagiwara et al. |
| 6,184,685 B1 | 2/2001 | Paulk et al. |
| 6,188,221 B1 | 2/2001 | Van de Kop et al. |
| 6,188,222 B1 | 2/2001 | Seydoux et al. |
| 6,225,806 B1 | 5/2001 | Millar et al. |
| 6,236,211 B1 | 5/2001 | Wynn |
| 6,236,212 B1 | 5/2001 | Wynn |
| 6,246,240 B1 | 6/2001 | Vail, III |
| 6,294,917 B1 | 9/2001 | Nichols |
| 6,339,333 B1 | 1/2002 | Kuo |
| 6,389,360 B1 | 5/2002 | Alft et al. |
| 6,415,231 B1 | 7/2002 | Hebert |
| 6,424,918 B1 | 7/2002 | Jorgensen et al. |
| 6,450,599 B1 | 9/2002 | Mamuyac |
| 6,480,000 B1 | 11/2002 | Kong et al. |

| | | | | | | |
|---|---|---|---|---|---|---|
| 6,499,817 B2 | 12/2002 | Jermain | EP | 0368762 | 5/1990 | |
| 6,573,855 B1 | 6/2003 | Hayakawa et al. | EP | 0512756 | 11/1991 | |
| 6,628,119 B1 | 9/2003 | Eidesmo et al. | EP | 0 481 886 | 4/1992 | |
| 6,662,147 B1 | 12/2003 | Fournier et al. | EP | 0568612 | 3/1996 | |
| 6,696,839 B2 | 2/2004 | Ellingsrud et al. | EP | 0814349 | 12/1997 | |
| 6,700,526 B2 | 3/2004 | Witten | EP | 1094338 | 4/2001 | |
| 6,717,411 B2 | 4/2004 | Ellingsrud et al. | EP | 1253437 | 10/2002 | |
| 6,826,483 B1 | 11/2004 | Anderson et al. | EP | 1253443 | 10/2002 | |
| 6,834,732 B2 | 12/2004 | Haarstad | EP | 1255126 | 11/2002 | |
| 6,842,006 B2 | 1/2005 | Conti et al. | EP | 1512033 | 12/2003 | |
| 6,859,038 B2 | 2/2005 | Ellingsrud et al. | EP | 1309887 | 3/2004 | |
| 6,864,684 B2 | 3/2005 | Ellingsrud et al. | EP | 1256019 | 6/2004 | |
| 6,900,639 B2 | 5/2005 | Ellingsrud et al. | FR | 2479992 | 10/1981 | |
| 6,917,564 B2 | 7/2005 | Leaney | FR | 2586302 | 2/1987 | |
| 6,950,786 B1 | 9/2005 | Sonneland et al. | GB | 188676 | 12/1922 | |
| 6,950,790 B1 | 9/2005 | Nichols | GB | 1342475 | 1/1974 | |
| 7,026,819 B2 | 4/2006 | Eidesmo et al. | GB | 1588495 | 4/1981 | |
| 7,028,806 B2 | 4/2006 | Dubinsky et al. | GB | 2089043 | 6/1982 | |
| 7,032,707 B2 | 4/2006 | Egerev et al. | GB | 2155182 | 9/1985 | |
| 7,038,456 B2 | 5/2006 | Ellingsrud et al. | GB | 2197078 | 5/1988 | |
| 7,038,850 B2 | 5/2006 | Chang et al. | GB | 2197952 | 6/1988 | |
| 7,042,802 B2 | 5/2006 | Sinha | GB | 220070 | 12/1989 | |
| 7,072,767 B2 | 7/2006 | Routh et al. | GB | 2220071 | 12/1989 | |
| 7,095,357 B1 | 8/2006 | Johler | GB | 2231602 | 11/1990 | |
| 7,106,065 B1 | 9/2006 | Graf | GB | 2256715 | 12/1992 | |
| 7,123,543 B2 | 10/2006 | Vaage et al. | GB | 2296567 | 7/1996 | |
| 7,126,338 B2 | 10/2006 | MacGregor et al. | GB | 2301902 | 12/1996 | |
| 7,145,341 B2 | 12/2006 | Ellingsrud et al. | GB | 2323443 | 9/1998 | |
| 7,149,672 B2 | 12/2006 | Torkildsen | GB | 2333364 | 7/1999 | |
| 7,202,669 B2 | 4/2007 | Ellingsrud et al. | GB | 2355538 | 4/2001 | |
| 7,319,330 B2 | 1/2008 | Amundsen | GB | 2382875 | 7/2001 | |
| 7,423,432 B2 | 9/2008 | Amundsen | GB | 2364390 | 1/2002 | |
| 7,471,089 B2 | 10/2009 | Helwig et al. | GB | 2384068 | 7/2003 | |
| 7,613,570 B2 | 11/2009 | Rosten et al. | GB | 2385923 | 9/2003 | |
| 664,603 A1 | 2/2010 | Rosten | GB | 2390904 | 1/2004 | |
| 7,664,603 B2 | 2/2010 | Rosten | GB | 2 391 946 | 2/2004 | |
| 7,919,965 B2 | 4/2011 | Schaug-Pettersen et al. | GB | 2395563 | 5/2004 | |
| 8,086,426 B2 | 12/2011 | El Ouair et al. | GB | 2399640 | 9/2004 | |
| 2003/0048105 A1 | 3/2003 | Ellingsrud et al. | GB | 2404444 | 2/2005 | |
| 2003/0050759 A1 | 3/2003 | Srnka et al. | GB | 2411006 | 8/2005 | |
| 2003/0052685 A1 | 3/2003 | Ellingsrud et al. | GB | 2413187 | 10/2005 | |
| 2004/0000912 A1 | 1/2004 | Conti et al. | GB | 2413188 | 10/2005 | |
| 2004/0003511 A1 | 1/2004 | Silver | GB | 2415511 | 12/2005 | |
| 2004/0017137 A1 | 1/2004 | Straub | GB | 2421800 | 7/2006 | |
| 2004/0027130 A1 | 2/2004 | Ellingsrud et al. | GB | 2 425 182 | 10/2006 | |
| 2004/0046568 A1* | 3/2004 | Unsworth et al. ............ 324/536 | JP | 2002 244580 | 8/2002 | |
| 2004/0090234 A1 | 5/2004 | Macune | JP | 2006 145 360 | 6/2006 | |
| 2004/0176910 A1 | 9/2004 | Ellingsrud et al. | WO | WO 81/01617 | 6/1981 | |
| 2005/0035696 A1 | 2/2005 | Parise et al. | WO | WO 89/10463 | 11/1989 | |
| 2005/0040742 A1 | 2/2005 | Tsai | WO | WO 90/00749 | 1/1990 | |
| 2005/0264294 A1 | 12/2005 | Constable | WO | WO 92/13172 | 8/1992 | |
| 2006/0005965 A1 | 1/2006 | Chouzenoux et al. | WO | WO 92/15771 | 9/1992 | |
| 2006/0038570 A1* | 2/2006 | Constable ..................... 324/334 | WO | WO 92/15900 | 9/1992 | |
| 2006/0091889 A1 | 5/2006 | Ellingsrud et al. | WO | WO 94/20864 | 9/1994 | |
| 2006/0103387 A1 | 5/2006 | Amundsen | WO | WO 96/06367 | 2/1996 | |
| 2006/0202697 A1 | 9/2006 | Sodal | WO | WO 96/33426 | 10/1996 | |
| 2007/0145980 A1 | 6/2007 | Conti et al. | WO | WO 96/35859 | 11/1996 | |
| 2007/0150201 A1 | 6/2007 | Eidesmo et al. | WO | WO 97/33184 | 9/1997 | |
| 2007/0294036 A1 | 12/2007 | Strack et al. | WO | WO 98/11455 | 3/1998 | |
| 2008/0065330 A1 | 3/2008 | Rosten et al. | WO | WO 98/28638 | 7/1998 | |
| 2008/0122444 A1 | 5/2008 | Schaug-Pettersen et al. | WO | WO 99/13966 | 3/1999 | |
| 2008/0169817 A1 | 7/2008 | Morrison et al. | WO | WO 00/00850 | 1/2000 | |
| 2008/0189043 A1 | 8/2008 | Anno et al. | WO | WO 00/13037 | 3/2000 | |
| 2008/0195358 A1 | 8/2008 | El Ouair et al. | WO | WO 00/13046 | 3/2000 | |
| 2008/0221795 A1 | 9/2008 | Amundsen et al. | WO | WO 00/54075 | 9/2000 | |
| 2009/0134877 A1 | 5/2009 | Schaug-Pettersen | WO | WO 00/63718 | 10/2000 | |
| 2009/0195251 A1 | 8/2009 | Darnet et al. | WO | WO 01/20366 | 3/2001 | |
| 2009/0243617 A1 | 10/2009 | Farrelly et al. | WO | WO 01/33481 | 5/2001 | |
| 2009/0265111 A1 | 10/2009 | Helwig et al. | WO | WO 01/55749 | 8/2001 | |
| 2009/0267608 A1 | 10/2009 | Johnstad et al. | WO | WO 01/57555 | 8/2001 | |
| 2009/0271118 A1 | 10/2009 | Saltzer et al. | WO | WO 02/14906 | 2/2002 | |
| 2010/0045295 A1 | 2/2010 | Mittet et al. | WO | WO 03/034096 | 4/2003 | |
| 2010/0052688 A1 | 3/2010 | Schaug-Pettersen | WO | WO 03/036331 | 5/2003 | |
| 2010/0057363 A1 | 3/2010 | Amundsen | WO | WO 03/042718 | 5/2003 | |
| 2010/0061187 A1 | 3/2010 | Sodal | WO | WO 03/048737 | 6/2003 | |
| | | | WO | WO 03/048812 | 6/2003 | |
| | FOREIGN PATENT DOCUMENTS | | WO | WO 03/100467 | 12/2003 | |
| EP | 0215695 | 3/1987 | WO | WO 03/104844 | 12/2003 | |
| EP | 0219234 | 4/1987 | WO | WO 01/42818 | 6/2004 | |

| WO | WO 2004/053528 | 6/2004 |
| WO | 2004/083898 | 9/2004 |
| WO | WO 2007/018810 | 2/2007 |

OTHER PUBLICATIONS

Brevik, "Rock model based inversion of saturation and pressure changes from time lapse seismic data," SEG 1999 Expanded Abstracts (4 pgs.).
Chave et al., "Controlled Electromagnetic Sources for Measuring Electrical Conductivity Beneath the Oceans 1", Forward Problem and Model Study, J. Geophysical Research, vol. 87, No. B7, pp. 5327-5338, Jul. 10, 1982.
Chave et al., "*Some Comments on Seabed Propagation of ULF/ELF Electromagnetic Fields*", 25 Radio Science 825-36 (Sep. 1990).
Cheesman et al., "On the theory of sea-floor conductivity mapping using transient electromagnetic systems", Geophysica, vol. 52. No. 2. Feb. 1987 pp. 204-217.
Constable et al., "Marine controlled-source electomagnetic sounding 2. The PEGASUS experiment" Journal of Geophysical Research. 101.B3 (1996): 5519-5530.
Constable et al., Marine Magnetotellurics for petroleum exploration, Part 1: A sea-floor equipment system. Geophysics 63(3) 816-825. (May-Jun. 1998).
Das.,"Apparent resistivity curves in controlled-source electromagnetic sounding directly reflecting true resistivities in a layered earth" vol. 60, No. 1, pp. 53-60 (Jan.-Feb. 1995).
Edwards et al., "Electromagnetic Assessment of Offshore Methane Hydrate Deposits in the Cascadia Margin", MARELEC 99, 1999.
Edwards et al., "The Assessment of Marine Gas Hydrates through Electrical Remote Sounding: Hydrate without a BSR", Geophysical Research Letters, vol. 27, No. 16, pp. 2397-2400, Aug. 15, 2000.
Edwards, "*On the Resource evaluation of Marine Gas Hydrate Deposits Using Sea-Floor Transient Electric Dipole-Dipole Methods*", 62 Geophysics 63-74 (Jan. 1997).
Eidesmo et al., "Remote detection of hydrocarbon filled layers using marine controlled source electromagnetic sounding," EAGE 64$^{th}$ Conference & Exhibition—Florence, Italy, 4 pages, May 27-30, 2002.
Eidesmo et al., "*Sea Bed Logging (SBL), a new method for remote and direct identification of hydrocarbon filled layers in deepwater areas*", 20 First Break (Mar. 2002).
Ellingsrud et al., "*How Electromagnetic Sounding Technique Could be Coming to Hydrocarbon E & P*", 20 First Break (Mar. 2002).
Ellingsrud et al., "Remote sensing of hydrocarbon layers by seabed logging (SBL): Results from a cruise offshore Angola," The Leading Edge, pp. 972-982, Oct. 2002.
Evans et al, Upper Crustal Resistivity Structure of the East-Pacific Rise Near 13 degrees North, Geophysical Research Letters, vol. 18, No. 10, pp. 1917-1920, Oct. 1991.
Evans et al., "On the Electrical Nature of the Axial Melt Zone at 13 degrees North on the East Pacific Rise", Journal of Geophysical Research, vol. 99, No. B1, pp. 577-588, Jan. 1994.
Evans, Constraints on the Large-Scale Porosity and Permeability Structure of Young Oceanic Crust from Velocity and Resistivity Data, Geophysical Journal International, vol. 119, pp. 869-879, 1994.
Explorations, Scripps Institute of Oceanography, vol. 4, No. 2, 1997.
Flosadottir et al., "Marine Controlled-Source Electromagnetic Sounding 1. Modeling and Experimental Design", Journal of Geophysical Research, vol. 101, No. B3, pp. 5507 to 5517, Mar. 10, 1996.
Garg et al., "*Synthetic Electric Sounding Surveys Over Known Oil Fields*", 49 Geophysics 1959-67 (Nov. 1984).
GB Search Report—GB 0119245.9 dated May 28, 2002.
Greeg et al., "Remote mapping of hydrocarbon extent using marine Active Source EM Sounding," EAGE 65$^{th}$ Conference & Exhibition—Stavanger, Norway, 4 pages, Jun. 2-5, 2003.
Hordt et al., "A First Attempt at Monitoring Underground Gas Storage by Means of Time-lapse Multi-Channel Transient Electromagnetics", Geophysical Prospecting, vol. 48(3), pp. 489-509, 2000.

Hoversten et al., Maring magnetotellurics for petroleum exploration, Part II: numerical analysis of subsalt resolution. Geophysics 63(3): 826-840 (May-Jun. 1998).
International Search Report—PCT/EP2008/050200 dated Nov. 24, 2008.
International Search Report dated Aug. 24, 2005 PCT/EP2005/051480 and Search Report 0407699.8 dated Sep. 9, 2004.
International Search Report dated Mar. 28, 2003 and International Preliminary Examination Report for PCT/GB02/05355 dated Dec. 9, 2003.
International Search Report dated Dec. 11, 2007 for PCT/2007/003484 and Search Reports for GB 0618238.0 dated Jan. 8, 2007.
International Search Report dated Jul. 28, 2005 for PCT/EP2005/051483 and GB 0407697.2 dated Sep. 14, 2004.
International Search Report for dated Aug. 1, 2005 PCT/EP2005/051484 and Search Report from GB 0407696.4 dated Sep. 9, 2004.
Kaufman et al., "Marine Electromagnetic Prosepecting System", 1981 Annual Meeting. Abstracts. 1 page.
Kaufman et al., "*EM Field of an Electric Dipole on the Surface of a Medium Containing a Thin Resistant Layer*", Frequency and Transient Soundings, publ. Elsevier, (1983).
LITHOS Cambridge advanced lithological imaging project. Aug. 21, 1997.
MacGregor et al. "Use of Marine Controlled Source Electromagnetic Sounding for sub-basalt exploration" EAGE 61st conference and Technical Exihibition, Apr. 2008. Finland. Jun. 1999.
MacGregor et al., "*Marine Controlled Source Electromagnetic Sounding: Development of a Regularized Inversion for 2-Dimensional Resistivity Structures*", 1 LITHOS Science Report 103-109 (Apr. 1999).
MacGregor et al., "Marine Controlled Source Electromagnetism: Effect of Source-Receiver Geometry on the Response of 1-D models", 1996.
MacGregor et al., "*The RAMESSES Experiment—III. Controlled-Source Electromagnetic Sounding of the Reykjanes Ridge*", 135 Geophys. J. Int. 773-89 (Jul. 1998).
MacGregor et al., Electrical resistivity structure of the Valu Fa Ridge, Lau Bain, from marine controlled-source electromagnetic sounding, Geophysical Journal International. 146.1 (2001): 217-236.
MacGregor, "Joint analysis of marine active and passive source EM data for sub-salt or sub-basalt imaging," EAGE 65$^{th}$ Conference & Exhibition—Stavanger, Norway, 4 pages, Jun. 2-5, 2003.
Mittet, R., et al., "Inversion of SBL data acquired in shallow waters," paper presented at EAGE 66th Conference & Exhibition, 5 pgs., (Jun. 6-10, 2004).
Mittet, Rune, et al., On the orientation and absolute phase of marine CSEM receivers, Geophysics, vol. 72 No. 4 pp. F145-F155 (Jul.-Aug. 2007).
Nekut et al., "Petroleum Exploration Using Controlled Source Electromagnetic, Methods", Proceedings of the IEEE, vol. 77(2), pp. 338-362, 1989.
Opderbecke, At-Sea Calibration of a USBL Underwater Vehicle Positioning System, Oceans 97 Conference Proceedings Halifax, NS, Canada, MTS/IEEE vol. 1 pp. 721-726 (Oct. 1997).
Osen et al., Removal of water-layer multiples from multicomponenet sea-bottom data. Geophysics. vol. 64, No. 3. pp. 838-851. May-Jun. 1999.
Peyronnet et al., "POSIDONIA 6000: A New Long Range Highly Accurate Ultra Short Base Line Positioning System" Oceans 98 Conference Proceedings, Nice, France IEEE, vol. 3, pp. 1721-1727 (Sep. 1998).
Preliminary Examination Report—PCT/GB01/03473 mailed Apr. 24, 2002.
Preliminary Examination Report—PCT/GB99/02823 dated Dec. 5, 2000.
GB Search Report—PCT/GB 0119245.9 dated May 28, 2002.
Preliminary Examination Report—PCT/GB00/04667 dated Jan. 29, 2002.
Preliminary Examination Report—PCT/GB99/03039 dated Oct. 10, 2000.
Rosten et al., (2003) A Seabed Logging Calibration Survey over the Ormen Lange Gas Field, EAGE, 65th An. Intern. Mtg. Eur.Assoc. Geosc.Eng.Extended Abstracts P058.

Rutledal et al., "Time-Lapse Elastic Inversion at the Oseberg Field," EAGE 64$^{th}$ Conference & Exhibition—Florence Italy May 27-30, 2002 (4 pgs.).

Search Report—PCT/GB00/04667 dated Mar. 9, 2001.

Sinha et al., *"Evidence for Accumulated Melt Beneath the Slow-Spreading Mid-Atlantic Ridge,"* 355 Phil. Trans. R. Soc. Lond. A 233-53 (Jan. 1997).

Sinha et al., "An Active Source Electromagnetic Sounding System for Marine Use", Marine Geophysical Researches, 12:59-68, 1990.

Sinha et al., *"Magmatic Processes at Slow Spreading Ridges: Implications of the RAMESSES Experiment at 57 deg. 45'N on the Mid-Atlantic Ridge,"* 135 Geophys. J. Int. 731-45 (Jul. 1998).

Sinha et al., "Sub-Sea-Floor Imaging for Structural and Lithological Properties Using Controlled Source Electromagnetic (CSEM) Sounding", Abstract for Technology for Deep-Sea Geological Investigations, Developments, Applications and Results, Nov. 11-12, 1998.

Sinha., "Controlled Source EM sounding: Survey design considerations for hydrocarbon applications" LITHOS Science Report. Apr. 1999: 95-101.

Slob, "Wave field decomposition of full-polarimetric data based on the two-way wave equation," Grounds Penetrating Radar, Proceedings of the 10$^{th}$ Int'l Conference on Delft, The Netherlands, Jun. 21-24, 2004, vol. 1 pp. 315-318 (Jun. 21, 2004).

Spies, "Recent Developments in the use of Surface Electrical Methods for Oil and Gas Exploration in the Soviet Union", Geophysics, vol. 48(8), pp. 1102-1112, 1983.

Strack et al., "Integrating Long-Offset Transient Electromagnetics (LOTEM) with Seismics in an Exploration Environment", Geophysical Prospecting, vol. 44, pp. 997-1017, 1996.

Unsworth et al., "Electromagnetic Induction by a Finite Electric Dipole Source Over a 2-D Earth", Geophysics, vol. 58, pp. 198-214, 1993.

Unsworth, "Electromagnetic Exploration of the Oceanic Crust with Controlled-Sources", Chptr 5, Insight into Induction, PhD Thesis, University of Cambridge, 1991.

Ursin, "Review of elastic and electomagnetic wave propagation in horizontally layered media" Geophysics. vol. 48, No. 8. pp. 1063-1081. Aug. 1983.

Varela et al., "Assessing dynamic reservoir behavior with time-lapse pre-stack 3D seismic data: a sensitivity study based on inversion," EAGE 64$^{th}$ Conference & Exhibition—Florence Italy May 27-30, 2002 (4 pgs.).

Young et al., "Electomagnetic Active Source Sounding Near the East Pacific Rise" Geophysical Research Letters. vol. 8, No. 10. pp. 1043-1046. Oct. 1981.

Yuan et al., "Electromagnetic Assessment of Offshore Methane Hydrate Deposits on the Cascadia Margin, GP22A-08", American Geophysical Union Fall Meeting, San Francisco, 1998.

Yuan et al., *"The Assessment of Marine Gas Hydrates Through Electrical Remote Sounding: Hydrate Without a BSR?"*, 27 Geophys. Res. Letts. 204-217 (Aug. 15, 2000).

Application and File History of U.S. Patent No. 6,628,119, issued Sep. 30, 2003, inventor Eidesmo.

Application and File History of U.S. Patent No. 7,026,819, issued Apr. 11, 2006, inventor Eidesmo.

Application and File History of U.S. Appl. No. 11/287,893, filed Nov. 28, 2005, inventor Eidesmo.

Application and File History of U.S. Patent No. 6,696,839, issued Feb. 24, 2004, inventor Ellingsrud.

Application and File History of U.S. Patent No. 6,864,684, issued Mar. 8, 2005, inventor Ellingsrud.

Application and File History of U.S. Appl. No. 11/585,992, filed Oct. 24, 2006, inventor Ellingsrud.

Application and File History of U.S. Appl. No. 11/585,991, filed Oct. 24, 2006, inventor Ellingsrud.

Application and File History of U.S. Patent No. 6,717,411, issued Apr. 6, 2004, inventor Ellingsrud.

Application and File Histroy of U.S. Patent No. 6,900,639, issued May 31, 2005, inventor Ellingsrud.

Application and File History of U.S. Patent No. 7,038,456, issued May 2, 2006. inventor Ellingsrud.

Application and File History of U.S. Patent No. 7,202,669, issued Apr. 10, 2007, inventor Ellingsrud.

Application and File History of U.S. Patent No. 7,423,432, issued Sep. 9, 2008, inventor Amundsen.

Application and File Histroy of U.S. Patent No. 7,319,330, issued Jan. 15, 2008, inventor Ellingsrud.

Application and File History of U.S. Publication No. 2006/0202697, published Sep. 14, 2006, inventor Sodal.

Application and File History of U.S. Publication No. 2008/0122444, published May 29, 2008, inventor Schaug-Pettersen.

Application and File History of U.S. Publication No. 2009/0134877, published May 28, 2009, inventor Schaug-Pettersen.

Application and File History of U.S. Patent No. 7,126,338, issued Oct. 24, 2006, inventor Eidesmo.

Application and File History of U.S. Publication No. 2007/0150201, published Jun. 28, 2007, inventor Eidesmo.

Application and File History of U.S. Patent No. 6,859,038, issued Feb. 22, 2005, inventor Ellingsrud.

Application and File History of U.S. Patent No. 7,145,341, issued Dec. 5, 2006, inventor Ellingsrud.

Application and File History of U.S. Publication No. 2010/0052688, published Mar. 4, 2010, inventors Schaug-Pettersen.

Application and File History of U.S. Appl. No. 12/441,632, filed Sep. 24, 2009, inventor Mittet.

Application and File History of U.S. Publication No. 2010/0045295, published Feb. 25, 2010, inventor Mittet.

Application and File History of U.S. Patent No. 7,149,672, issued Dec. 12, 2006, inventor Torkildsen.

Application and File History of U.S. Publication No. 2008/0195358, published Aug. 14, 2008, inventor El Ouair.

Application and File History of U.S. Pubication No. 2008/0065330, published Mar. 13, 2008, inventor Rosten.

Application and File History of U.S. Publication No. 2008/0221795. Sep. 11, 2008, inventor Amundsen.

Application and File History of U.S. Publication No. 2010/0057363, published Mar. 4, 2010, inventor Amundsen.

Application and File History of U.S. Patent No. 6,834,732, issued Dec. 28, 2004, inventor Haarstad.

Application and File History of U.S. Appl. No. 12/443,189, filed Dec. 30, 2009, inventor Ridyard.

Application and File History of U.S. Publication No. 2010/0061187, published Mar. 11, 2010, inventor Sodal.

Application and File Wrapper of U.S. Appl. No. 61/298,582, filed Jan. 27, 2010, inventor Perryman.

Bermejo, Geophysical Discovery of a New LNAPL Plume at the Former Wurtsmith AFB, Oscoda, Michigan, Fall 1997 GWMR. pp. 131-137.

About GSSI—Ground Penetrating Radar Equipment Manufacturer, printed Jan. 10, 2012. 2 pages.

Ground Penetrating Radar and Geophysical Services, printed Jan. 10, 2012. 5 pages.

Model 4108 Horn Antenna System Settings and User Notes. Feb. 2002. 7 pages.

* cited by examiner

INSTRUMENT FOR MEASURING ELECTROMAGNETIC SIGNALS

RELATED APPLICATIONS

This application is a national stage entry from PCT Application No. PCT/GB2007/002138 filed Jun. 8, 2007, which claims priority to Great Britain Application No. 0611497.9 filed Jun. 9, 2006, the disclosures of which are hereby incorporated by reference in their entireties.

TECHNICAL FIELD

The present invention is directed towards instruments for measuring electromagnetic signals, and particularly, towards instruments for taking measurements at or near the seafloor during electromagnetic surveying, or "Sea Bed Logging".

BACKGROUND

Sea Bed Logging methods can be used to detect hydrocarbon reservoirs beneath the sea floor. These methods comprise deploying an electromagnetic source near the sea floor and measuring the response using receiver instruments located at intervals spaced across the sea floor. The receiver instruments may be in the form of long rigid arms carrying electrical sensors, extending from a central body, which facilitates the detection of low level electrical signals in sea water.

The method of deploying existing instruments is as follows: the positively buoyant instrument and an attached concrete anchor are dropped from a survey vessel at a chosen location; the instrument sinks freely to the sea floor; the position of the instrument while sinking is monitored by acoustic methods; the instrument is positioned on the sea floor in a desired location when steady and the instrument is then used to measure and store data while located on the sea floor. After the measurements are complete, acoustic commands from the sea surface cause the instrument to be released from the anchor; the instrument then floats up to the sea surface for retrieval by a survey vessel and the data are extracted from the instrument.

The speed and efficiency of deployment and storage of the receiver instruments affects the overall efficiency of the survey. The mechanical performance of the instruments also affects the survey results. While instruments are known which may be partially disassembled for storage, these require sensor wires to be disconnected from sensors and data loggers when removing the arms for storage. This leads to the requirement for a system to track all the individual arms, sensors and data-loggers, and manage the reconnection back to the correct channel input. Further, a risk of failure or degradation is introduced each time a marine electrical connector is opened and reconnected.

Higher degrees of accuracy in sensor positioning are required for new acquisition techniques, for example, 3D acquisition, as well as being desirable for improving the accuracy of results obtained from other processing techniques. Therefore, there is a need to improve the performance of receiver instruments, in order to improve the accuracy and efficiency with which surveys may be carried out.

SUMMARY OF THE INVENTION

The aim of the present invention is to provide a device for detecting electromagnetic signals, which minimises drag when moving through water, and which allows sensors to be positioned with a high degree of accuracy; the device having arms which are thin, strong, stiff horizontally but flexible vertically while measurements are being taken, stiff in use but which can be disassembled without disconnection of wires connecting sensors and data loggers, flexible and unjointed when the instrument is not in use, and which minimise vibrations introduced by underwater currents, among other goals.

According to the present invention, there is provided an electromagnetic signal detecting device, comprising a central housing, a data management system located within the housing, and at least two arms extending outwards from the housing, each arm comprising a flexible elongate sheath attached to the housing, a sensor head, a flexible electrical cable attached to the sheath and connecting the sensor head to the data management system, and a relatively rigid rod which is removably locatable within the sheath, connectable relative to the housing at one end and connectable relative to the sensor head at the end remote from the housing.

During deployment of the device, the rod is located within the sheath, connected relative to the housing and connected relative to the sensor head, whereby the sheath and the flexible electrical cable are held in the same configuration as that of the rod. Preferably, the rod is straight and extends away from the housing, perpendicularly to the point at which it is connected relative to the housing.

Preferably, the rod is connected to a bracket located on the housing. Preferably, each rod is connected to the bracket by a latch connection with a ferrule located at the end of the rod. Preferably, the ferrule is fabricated from metal, more preferably stainless steel.

Preferably, when the device is not in use, for example during storage or transportation, the rod is removed from the sheath and disconnected from the rest of the device. The rod may then be stored separately from the rest of the device. The arm may be stored in a coiled or folded configuration close to the housing, to which the sheath may remain attached. These storage arrangements minimise the storage footprint of the device. The complexity and duration of the preparation of the device for deployment after a period of non-use is also minimised. The preparation simply comprises locating the rod within the sheath and connecting the rod relative to the housing and relative to the sensor head.

Preferably, the housing is cuboid in shape. Preferably, the geometrical center lines of two arms are parallel and extend outwards from opposite points on the perimeter of the housing. Preferably, the arms are approximately horizontal when the device is deployed. Optionally, the device has four arms, comprising two pairs of two parallel arms, with one pair orthogonal to the other.

Preferably, the rod is fabricated from fiber glass. Preferably, the rod is connected to a second similar rod by a connector, to form a twin rod assembly wherein the rods are parallel when the rods are not connected relative to the housing. When the first rod is located within the sheath and connected to the bracket, the second rod is connected to a second bracket located on the IU housing. The second bracket is on the same side wall of the housing and on the same horizontal plane as the first bracket, but spaced as far apart as possible from the first bracket. When connected, the second rod stiffens the arm against horizontal movement and bending, while vertical bending of the arm is not greatly impeded. This enables the horizontal position of the sensor heads to be known with greater accuracy and improves the processing of survey data.

When connected to the brackets, the two rods thus form two sides of an approximate triangle. The ends of the rods are preferably attached into the brackets perpendicularly to the sidewall of the housing from which the arm extends, so the sides of the "triangle" formed by the rods are slightly bent into an "S" shape. This increases the stiffness of the arm and stabilizes the position of the sensor heads. When the instrument is in use on the sea floor, this also minimises horizontal vibrations of the arms caused by water streams near the sea floor. Bending forces prevent certain oscillation modes of the arms which can be introduced in systems having only one rod per arm.

Preferably, the sensor head is attached to the sheath, and is located at the end remote from the housing. Preferably, each sensor head comprises one or more electrical sensors. More preferably, each sensor head comprises two electrical sensors. In the case of failure of one of the electrical sensors in a sensor head, the second sensor can continue to record data.

Preferably, the data management system comprises data loggers and components arranged to control the positioning and release of the device during deployment. Preferably, each electrical sensor is connected to one data logger via the electrical cable connecting the data management system and the sensor head in which the electrical sensor is located.

Optionally, the device also comprises magnetic sensors located in the housing. Optionally, there are two magnetic sensors per electrical sensor.

Optionally, the flexible electrical cable is attached to the sheath by a soft braid. The electrical cable may be attached to the sheath continuously along the length of the arm, or alternatively, it may be attached to the sheath only at certain points spaced along the length of the arm. Alternatively, the electrical cable may be incorporated in the fabric of the sheath.

According to the present invention in its broader sense, there is provided an instrument for detecting electromagnetic signals, having arms comprising two removable rods and a flexible conduit, whereby, while the instrument is in use, the arms are stiff in the horizontal direction and flexible in the vertical direction, and while the instrument is not in use the arm can be disassembled.

Before the instrument is deployed, the arms are made rigid and straight by feeding a rod into the sheath. The rods are then fixed to brackets on the main body of the instrument with individual quick-lock type connections. This assembly process can easily be conducted as a single person operation. When the instrument is not in use, the arms can be disassembled, the rigid rods stored separately and the flexible conduit stored, or coiled, next to the instrument.

BRIEF DESCRIPTION OF THE DRAWINGS

The invention may be put into practice in a number of ways and one embodiment is shown here by way of example with reference to the following figures, in which.

DETAILED DESCRIPTION

Figure 1:
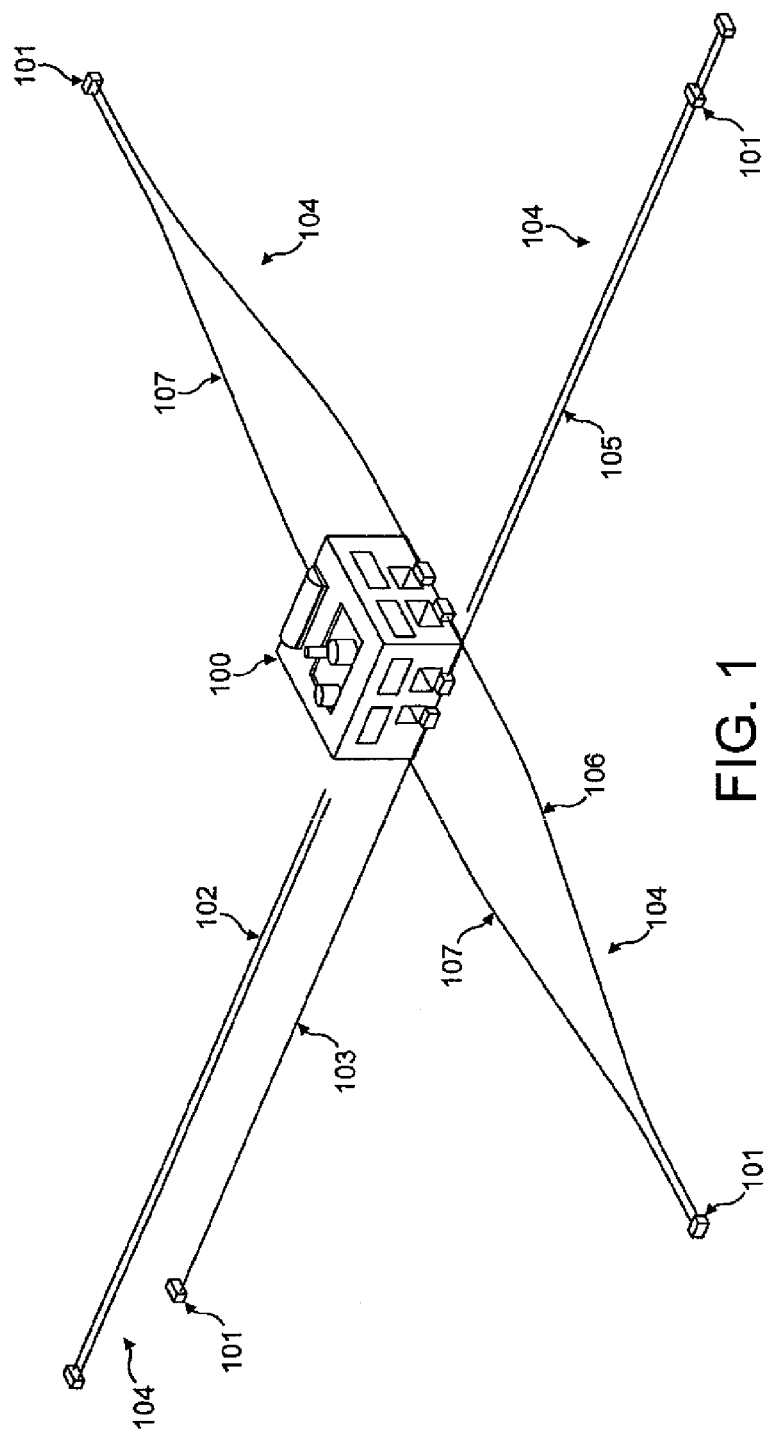
FIG. 1 is a schematic perspective view of a device according to the invention.

According to the embodiment shown in FIG. 1, the instrument comprises an approximately cuboid logger frame 100 and four arms 104 with integrated sensor heads 101. The approximate dimensions of the logger frame 100 are 0.7 m×0.7 m×0.7 m. Each arm is approximately 3.9 m in length and extends out from one of the four sidewalls of the logger frame 100. The sensor heads 101 are located at the end of each arm 104 furthest from the point where the arm connects to the logger frame 100. There is therefore a distance of approximately 8 m between opposite pairs of sensors heads 101. There is one pair of sensor heads 101 in each of two directions, the two directions being approximately orthogonal and horizontal when the instrument is in use during an electromagnetic survey. Each sensor head comprises two single electrical sensors. Each single electrical sensor is connected by signal wires to a central data logger located inside the logger frame 100.

The instrument also comprises a number of magnetic sensors mounted within the logger frame. The arms enable the position of each electrical sensor relative to a pair of magnetic field sensors to be chosen and accurately maintained.

The arms 104 are rigid when the instrument is in use. Each arm comprises a pair of connected flexible glass fibre rods 102, and when the instrument is in use, one end of each rod is attached into two spaced brackets on the logger frame 100. The space between the two brackets depends on the dimensions of the logger frame and here the two brackets for each arm are positioned at opposite bottom corners of the side of the logger frame to maximise their separation. The other ends of each of the two rods 102 are connected at the sensor head end of the arm.

In each arm, one of the two rods 107 is not located within the sheath, and its main function is to allow the entire arm to be stabilized in the horizontal direction while maintaining flexibility in the vertical direction, when the instrument is in use. The other rod is located in a sheath 103 constructed from a flexible plastics material. The signal wires (not shown) for each arm extend between the electrical sensors and the logger frame, and are fastened along the outside of the sheath, secured by a protective soft braid. The total outer dimension of each arm is thus minimised. In FIG. 1, arm 105 is in a partly assembled state and arm 106 is in a fully assembled state.

The vertical flexibility of the arms is important as it allows arms to bend safely when the instrument is sinking towards or rising up from the sea floor. This also minimises drag forces which increases the speed of the sinking or rising stage and reduces overall operation time.

The rod located in the sheath 103 can be removed from the sheath when the instrument is not in use. The sheath can then be coiled and stored beside the logger frame without disconnecting the signal wires and sensors. This minimises the storage space required for the instrument, wear on the electrical equipment and the time required to assemble the instrument before use.

The pairs of glass fibre rods 102 are all of the same dimensions and thus interchangeable. They can be stored separately from the logger frame, also minimising the storage space required.

Figure 2:
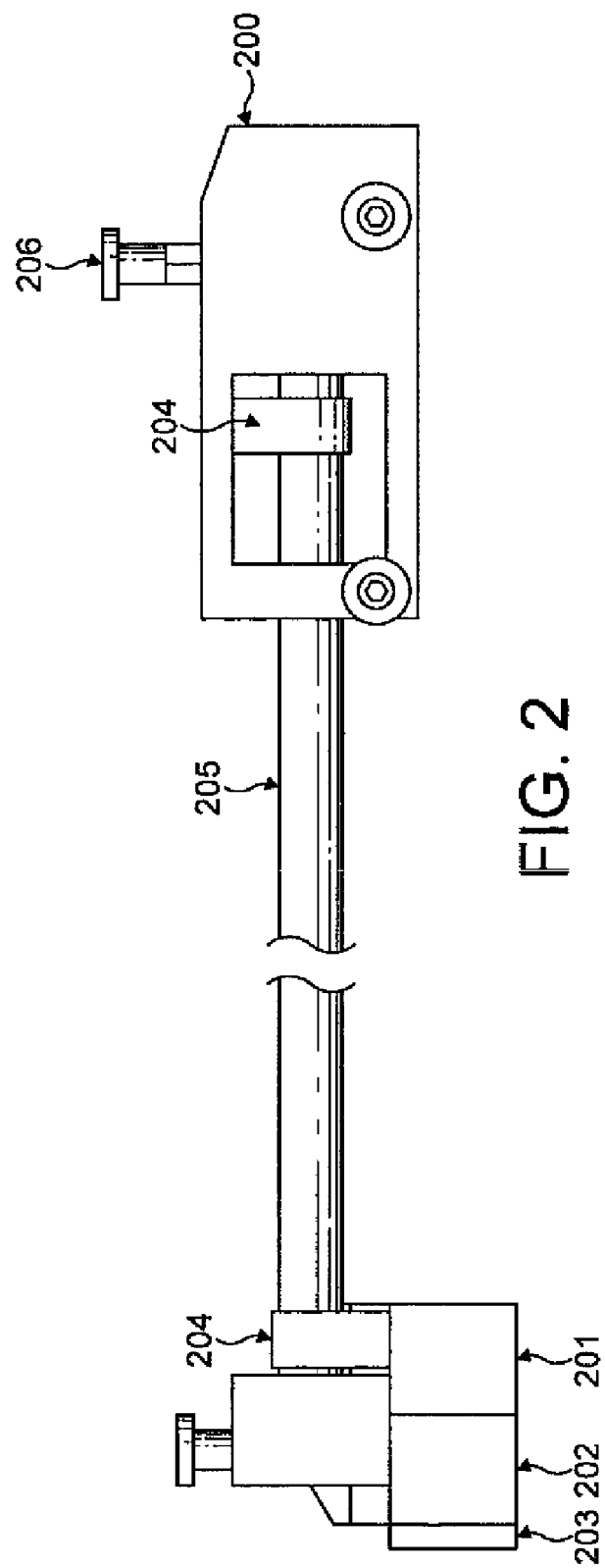
FIG. 2 as an enlarged view of a sheath and sensor head, according to the invention.

FIG. 2 shows details of an arm according to the invention, in which a rod is located within sheath 205 and connected to bracket 200 by the pin 206. Retainers 204 attach the sheath 205 to the bracket 200 and the sensor head 203. Electrical sensors 201 and 202 are located on the sensor head 203.

Figure 3:
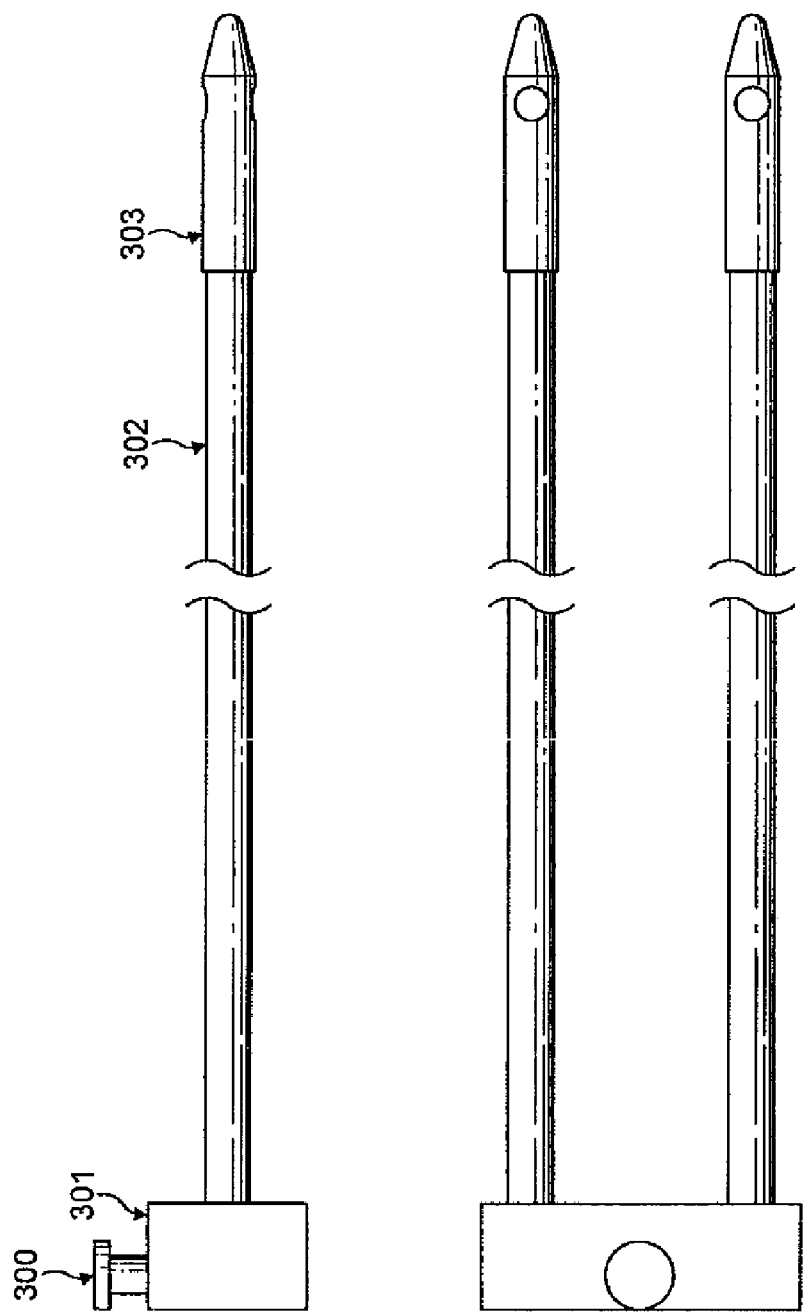
FIG. 3 is an enlarged view of a twin rod assembly according to the invention.

FIG. 3 shows details of a pair of flexible glass fibre rods which are to be attached to the frame according to the invention. A connector 301, with a latch 300 for attaching the connector to the sensor head of an arm, connects the ends of two flexible glass fibre rods 302, which are terminated at the other ends with ferrules 303. The ferrules 303 are made of, for example, stainless steel.

Figure 4:
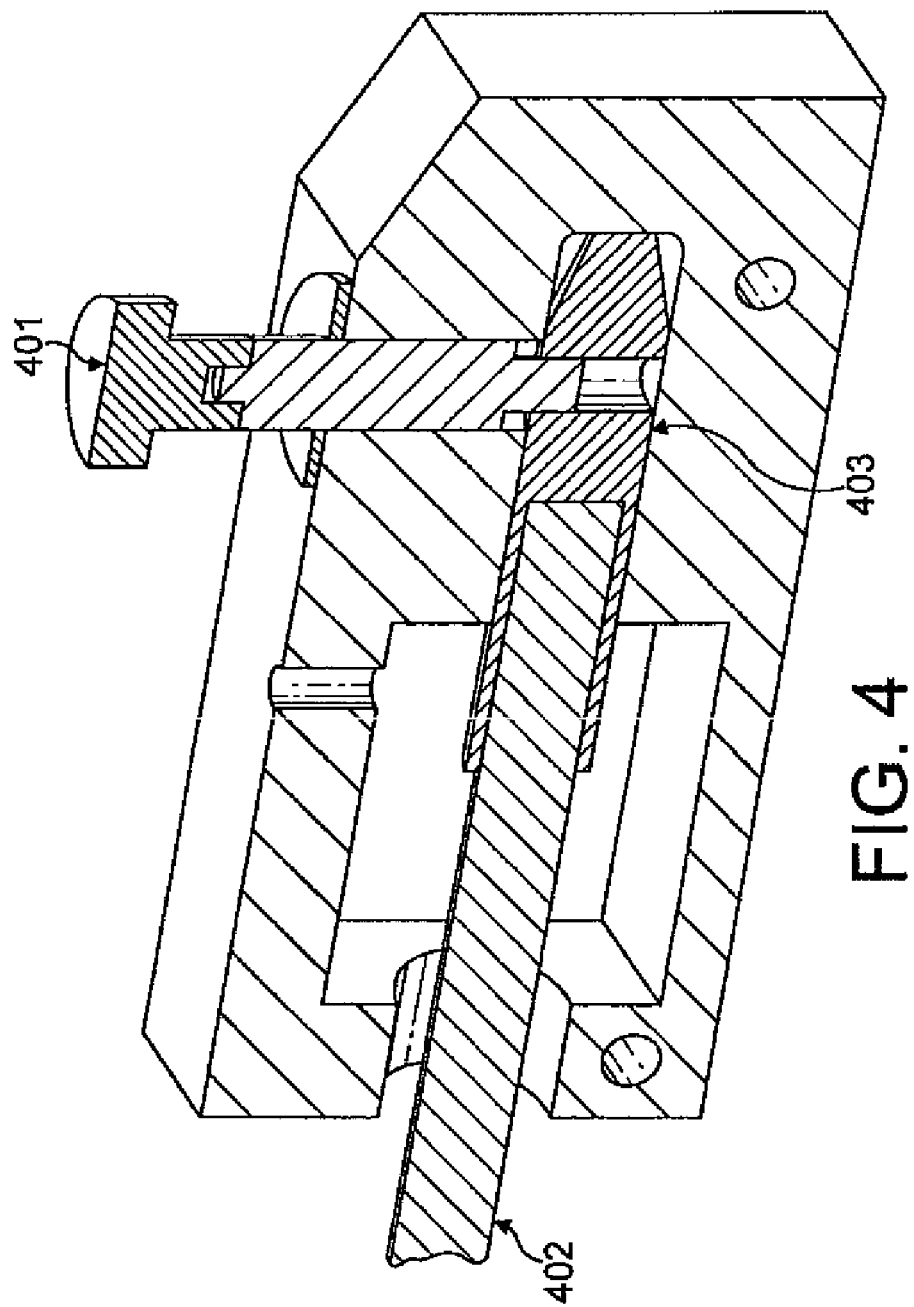
FIG. 4 is a perspective view to an enlarged scale of the connection of a rod to a bracket according to the invention.

FIG. 4 shows the way in which the rods of FIG. 3 are attached to the frame or main body of an instrument via a bracket. The rod 402 and its ferrule 403 are releasably retained in a bracket by the pin 401.

The mechanical properties of the arms do not affect the measurement system itself. However, the arms enable fixed distances and angles between sensors to be maintained during measurements, thus improving the quality of survey results. The arms also fulfil the function of guiding the signal wires from the sensors to the data logging units in the logger frame.

The invention claimed is:

1. An electromagnetic signal detecting device, which comprises electromagnetic signal detecting instruments borne by arms, wherein each arm comprises a removable rod and a flexible conduit arranged to receive the rod, the device further comprising:
    a central housing;
    a data management system located within the housing;
    at least two arms, the arms extending outwards from the housing;
    wherein each arm comprises—
    a sensor head, the sensor head constituting at least part of the electromagnetic signal detecting instruments;
    a flexible elongate sheath attached to the housing, the flexible elongate sheath constituting at least part of the flexible conduit;
    a flexible electrical cable attached to the sheath and connecting the sensor head to the data management system; and
    the rod which is removably locatable within the sheath;
    wherein the rod is more rigid than the sheath and one end of the rod is connectable relative to the housing and one end of the rod remote from the housing is connectable relative to the sensor head, and wherein each rod is connected to a second similar rod at a point along said each rod which is remote from the housing, one end of the second rod being independently connectable relative to the housing.

2. An electromagnetic signal detecting device according to claim 1, suitable for use under water.

3. An electromagnetic signal detecting device according to claim 1, wherein the rod is straight and extends away from the point of attachment relative to the housing, substantially perpendicularly to the housing.

4. An electromagnetic signal detecting device according to claim 1, wherein the rod is connected to a bracket located on the housing.

5. An electromagnetic signal detecting device according to claim 1, wherein the rod is fabricated from fiber glass.

6. An electromagnetic signal detecting device according to claim 1, wherein the number of arms is four, comprising two pairs of arms which are substantially parallel to each other, one pair of arms being substantially orthogonal to the other.

7. An electromagnetic signal detecting device according to claim 1, wherein the sensor head is attached to the sheath at the end of the sheath remote from the housing.

8. An electromagnetic signal detecting device according to claim 1, wherein each sensor head comprises one or more electrical sensors.

9. An electromagnetic signal detecting device according to claim 1, wherein each sensor head comprises two electrical sensors.

10. An electromagnetic signal detecting device according to claim 1, wherein one or more magnetic sensors are located in the central housing.

11. An electromagnetic signal detecting device according to claim 1, wherein the flexible electrical cable is attached to the sheath with one or more connectors.

12. An electromagnetic signal detecting device according to claim 11, wherein the flexible electrical cable is incorporated in the fabric of the sheath.

13. A method of deploying an electromagnetic signal detecting device having a housing which comprises;
    storing the device, the device comprising electromagnetic signal detecting instruments borne by arms, a data management system located within the housing and at least two arms extending outwardly from the housing, wherein each arm comprises:
    a sensor head constituting at least part of the electromagnetic signal detecting instruments;
    a flexible elongate sheath attached to the housing;
    a flexible electric cable attached to the sheath and connecting the sensor head to the data management system; and
    a rod removably locatable within the sheath, wherein the rod is more rigid than the sheath;
    locating the rods within the flexible elongate sheaths, connecting the rods relative to the housing at one end and connecting the rods relative to the sensor head at an end of each rod remote from the housing, wherein each rod is connected to a second similar rod at a point along said each rod which is remote from the housing, one end of the second rod being independently connectable relative to the housing; and
    using the device to detect electromagnetic signals.

14. A method according to claim 13, additionally comprising the step of positioning the device on or near the seafloor before using the device to detect electromagnetic signals.

15. A method of deploying an electromagnetic signal detecting device according to claim 13, wherein a controlled electromagnetic source near the sea floor is the origin of the electromagnetic signals.

* * * * *